(12) United States Patent
Zachrisson (10) Patent No.: US 8,490,924 B2
(45) Date of Patent: Jul. 23, 2013

(54) ARRANGEMENT AND METHOD FOR LAUNCHING COUNTER-MEASURES

(75) Inventor: Björn Zachrisson, Sollentuna (SE)

(73) Assignee: SAAB AB, Linköping (SE)

( * ) Notice: Subject to any disclaimer, the term of this patent is extended or adjusted under 35 U.S.C. 154(b) by 218 days.

(21) Appl. No.: 12/995,294

(22) PCT Filed: May 30, 2008

(86) PCT No.: PCT/SE2008/050638
§ 371 (c)(1),
(2), (4) Date: Feb. 16, 2011

(87) PCT Pub. No.: WO2009/145687
PCT Pub. Date: Dec. 3, 2009

(65) Prior Publication Data
US 2011/0155856 A1    Jun. 30, 2011

(51) Int. Cl.
*B64C 1/22* (2006.01)

(52) U.S. Cl.
USPC .......... 244/137.1; 244/136; 244/200; 244/60; 89/1.52; 89/1.53; 89/1.58; 89/1.51; 102/505

(58) Field of Classification Search
USPC . 244/199, 136, 137.1, 200, 36; 89/1.51–1.54, 89/1.58–1.59; 102/505
See application file for complete search history.

(56) References Cited

U.S. PATENT DOCUMENTS

| | | | | |
|---|---|---|---|---|
| 2,258,281 A | * | 10/1941 | Dunajeff | 89/1.59 |
| 2,395,547 A | * | 2/1946 | Hojnowski | 89/1.59 |
| 3,459,099 A | * | 8/1969 | Litz, Jr. et al. | 89/1.51 |
| 3,517,584 A | * | 6/1970 | Robinson et al. | 89/1.51 |
| 4,453,675 A | * | 6/1984 | Kodadek et al. | 239/675 |
| 4,524,670 A | * | 6/1985 | Billard et al. | 89/1.53 |

(Continued)

FOREIGN PATENT DOCUMENTS

| GB | 2283559 A | 5/1995 |
|---|---|---|
| WO | WO 00/59782 | 10/2000 |

OTHER PUBLICATIONS

PCT/ISA/210—International Search Report—Jan. 14, 2009.

(Continued)

*Primary Examiner* — Isam Alsomiri
*Assistant Examiner* — Assres H Woldemaryam
(74) *Attorney, Agent, or Firm* — Venable LLP; Eric J. Franklin (57) ABSTRACT

A method for launching counter-measures from a launch opening of a dispenser mounted on an aeroplane. The counter-measures are launched in a direction obliquely forwards and downwards relative to the aeroplane. In order to facilitate launching of counter-measures, a low dynamic pressure is created permanently across the launch opening of the dispenser by a fixed element acting on the air stream. An arrangement for storing and launching counter-measures including an elongate body provided with at least one launch opening used for storing the counter-measures in compartments. The arrangement is designed to be mounted on an aeroplane with the longitudinal direction of the elongate body essentially coinciding with the flight direction of the aeroplane. The counter-measures are connected to a firing control unit for feeding firing signals to the counter-measures. The arrangement is designed to be mounted under the aeroplane. The compartments include openings and are intended for launching the counter-measures in a direction obliquely forwards and downwards relative to the aeroplane.

16 Claims, 7 Drawing Sheets

U.S. PATENT DOCUMENTS

| | | | | |
|---|---|---|---|---|
| 4,679,483 | A * | 7/1987 | Wrana | 89/1.51 |
| 4,696,442 | A * | 9/1987 | Mazzitelli | 244/53 B |
| 4,743,057 | A * | 5/1988 | Loren | 296/180.1 |
| 4,773,692 | A * | 9/1988 | Schleicher et al. | 296/180.5 |
| 5,136,951 | A * | 8/1992 | Herrlinger | 102/340 |
| 5,143,320 | A * | 9/1992 | Boyadjian | 244/3.21 |
| 5,381,721 | A * | 1/1995 | Holmstrom et al. | 89/1.51 |
| 5,413,024 | A * | 5/1995 | Plummer | 89/1.816 |
| 6,279,482 | B1 * | 8/2001 | Smith et al. | 102/374 |
| 6,619,178 | B1 * | 9/2003 | Fransson et al. | 89/1.51 |
| 6,929,214 | B2 * | 8/2005 | Ackleson et al. | 244/1 R |
| 7,028,947 | B2 * | 4/2006 | Burns | 244/1 TD |
| 7,322,638 | B2 * | 1/2008 | Larson | 296/180.5 |
| 7,367,531 | B2 * | 5/2008 | Greene | 244/195 |
| 7,370,836 | B2 * | 5/2008 | Greene | 244/195 |
| 7,614,334 | B2 * | 11/2009 | Bellino et al. | 89/1.51 |
| 7,866,246 | B2 * | 1/2011 | Bellino et al. | 89/1.51 |
| 7,905,169 | B2 * | 3/2011 | Travis | 89/1.51 |
| 8,282,036 | B2 * | 10/2012 | Funck | 244/36 |
| 8,297,165 | B2 * | 10/2012 | Travis | 89/1.51 |
| 2002/0011742 | A1 * | 1/2002 | Choi | 296/180.1 |
| 2002/0117073 | A1 * | 8/2002 | Brum | 102/505 |
| 2004/0200381 | A1 * | 10/2004 | Zatterqvist | 102/505 |

OTHER PUBLICATIONS

PCT/ISA/237—Written Opinion of the International Searching Authority—Jan. 14, 2009.

* cited by examiner

ARRANGEMENT AND METHOD FOR LAUNCHING COUNTER-MEASURES

CROSS-REFERENCE TO RELATED APPLICATIONS

This application is the national phase under 35 U.S.C. §371 of PCT/SE2008/050638 filed 30 May 2008.

FIELD OF THE INVENTION

The present invention relates to a method for launching counter-measures, such as flares and chaff, from a dispenser which is mounted on an aircraft. The invention also relates to an arrangement for storing and launching counter-measures, such as flares and chaff, comprising an elongate body provided with at least one launch opening. The arrangement being designed to be mounted on an aircraft of the aeroplane type, with the longitudinal direction of the elongate body essentially coinciding with the flight direction of the aircraft, and the counter-measures being connected to a firing control unit for feeding firing signals to the counter-measures. The counter-measures can consist of passive means, such as chaff foil or metal-coated glass fibres, but can also consist of flares, for example IR flares, or other active measures.

BACKGROUND OF THE INVENTION

An example of a previously known arrangement or dispenser which is used for launching counter-measures and is provided with compartments is described in document U.S. Pat. No. 4,679,483. In this case, the dispenser is configured and mounted on the aeroplane in such a way that the counter-measures are launched obliquely rear-wards and downwards relative to the aeroplane.

Another example of a dispenser is known from U.S. Pat. No. 4,524,670. In this case, the dispenser is mounted on the underside of the aeroplane for launching the counter-measures downwards relative to the aeroplane.

A particular problem in launching flares is that the flares need time to develop into fully active decoy targets. There is a risk that the flares will only become fully active decoy targets at such a great distance from the aeroplane that a target seeker will be able to continue to follow the plane without any great problem.

EP 1194331 suggests a method and arrangement for launching counter-measures in a direction obliquely forwards and upwards relative to the aircraft.

The above examples are examples of countermeasure dispensers which in historical terms have been able to function well, i.e. to successfully divert enemy attack, for example in the form of a target-seeking missile, towards the decoy target. However, over the course of time, target-seeking functions have been developed further, and there is now therefore a greater possibility of distinguishing the decoy target from the aeroplane. For example, the target seeker can be specially programmed to handle the preliminary phase of activation of counter-measures. Information which can be used in this connection is the direction in which the counter-measures are launched relative to the aeroplane. In principle, the target seeker expects the counter-measures to be launched downwards, obliquely rearwards, or possibly rearwards.

SUMMARY OF THE INVENTION

One object of the present invention is to make available a method for launching counter-measures and an arrangement for storing and launching the counter-measures which increase the possibility, compared to known techniques, of avoiding threats, for example in the form of target-seeking missiles, enemy aircraft or the like.

Another object is to prevent the occurrence of vibration disturbances which are primarily caused by inherent oscillations in compartments which have been emptied of counter-measures.

The objects of the invention are achieved by a method and also by an arrangement.

By launching the counter-measures in the direction in accordance with the present invention, a separating procedure is obtained which is difficult to identify in relation to previously known separation procedures.

By launching the flares in the direction according to the present invention, the flares have time to develop to fully active decoy targets before they pass the main heat source of the plane pertaining to the heat generation of the jet engines.

In this connection it may be noted that it is known per se to arrange a launching device on a plane which launches bombs or missiles obliquely forwards and downwards, see U.S. Pat. No. 3,517,584. The object of doing this is to effect launching which does not affect the plane's speed and position despite the fact that very heavy objects are being launched. The solution is based on launching the bombs or missiles obliquely forwards by controlling guide rails. As soon as the bombs or the missiles leave the guide rails and thus the discharge opening, they lie in a rearward directed trajectory relative to the aeroplane and are only then activated. During the actual launch phase for a missile or a bomb, a hatch is opened which in the opened state has the task of reducing the air resistance in the slipstream. The slipstream is employed to quickly lift missiles or bombs away from the discharge opening. When closed, the hatches form an even, streamlined structure.

This launching of bombs or missiles in accordance with the above paragraph cannot be compared with the arrangement according to the invention for launching counter-measures, such as flares and chaff. Where counter-measures are concerned, it is lighter objects that are being launched and these objects are activated directly or shortly after they have left the discharge opening and in a first stage act near the aeroplane to create a favourable starting point for misleading radar, IR target seekers, or the like.

On discharge, the air stream is disturbed such that the counter-measures can be kept near the aeroplane for as long as possible. The air stream is lifted over the discharge opening in order to minimize impact or relative wind against the counter-measures and to prevent transmission of air induced vibrations to the counter measure launcher and/or counter measure cartridges.

The counter-measures can advantageously be launched obliquely forwards and downwards and to the side. By adding in a lateral component, the launched counter-measures can be guided out further from the main body of the aeroplane. Such an arrangement reduces the risks of inadvertent collisions occurring between counter-measures and aeroplane body.

At the front part of the arrangement there is a front opening comprising a compartment section with a number of compartments, intended to accommodate counter-measures in the form of preferably propelled or un-propelled flares or chaff. The compartments are suitably designed to slope forwards 30° to 60° and preferably about 45° relative to the aircraft.

It should be emphasized here that it is not just the compartments which control the direction of launching. It also depends on how the counter-measures, preferably in cartridge form, are arranged in the compartments. The cartridges can to a certain extent be turned in the compartments. The inclination of the cartridges can be altered relative to the longitudinal and transverse walls of the compartments. In addition, the cartridges can be arranged to lie with the opening side essentially diagonal relative to the openings of the compartments. In principle, all geometrically possible positions can be considered for acting on the direction of launching and may be used.

To make it easier to launch the counter-measures obliquely forwards and downwards, the elongate body of the arrangement is provided with fixed means acting on the air stream in order to permanently create a low dynamic pressure across the compartment openings. This reduces the forces which act on the counter-measures during the phase when they leave the compartments of the elongate body via the compartment openings. The effect on the counter-measures during the launching phase is less, the result of which is that the launching force can be limited and the risks of damage to the counter-measures are reduced. For example, breaks and/or dis-integration of flares can be avoided.

When a compartment has been emptied of its contents of counter-measures, the compartment can act as a barrel which oscillates at its inherent frequency. Under unfavourable conditions, extremely high air induced noise and vibration levels can occur. The creation of a low dynamic pressure across the compartment openings has been shown to effectively counteract oscillations caused by the inherent frequencies of the compartments, since the low dynamic pressure near the openings of the compartments means low energy.

Low dynamic pressure across the compartment openings can be created in a number of ways and, in particular, several measures can be combined to produce a low dynamic pressure across the compartment openings.

According to an advantageous embodiment, the means for creating a low dynamic pressure across the compartment openings comprise a spoiler element arranged at the front end of the elongate body. Preferably, the spoiler element comprises a substantially cylindrically shaped member. The cylindrically shaped member has the advantage over conventionally shaped spoiler design in that it maintains its functionality within the full speed interval, up to and including super sonic, still keeping the added drag component relatively lower.

BRIEF DESCRIPTION OF THE DRAWINGS

The invention will be described in greater detail below by way of illustration and with reference to the attached drawings, in which.

DETAILED DESCRIPTION

Figure 1:
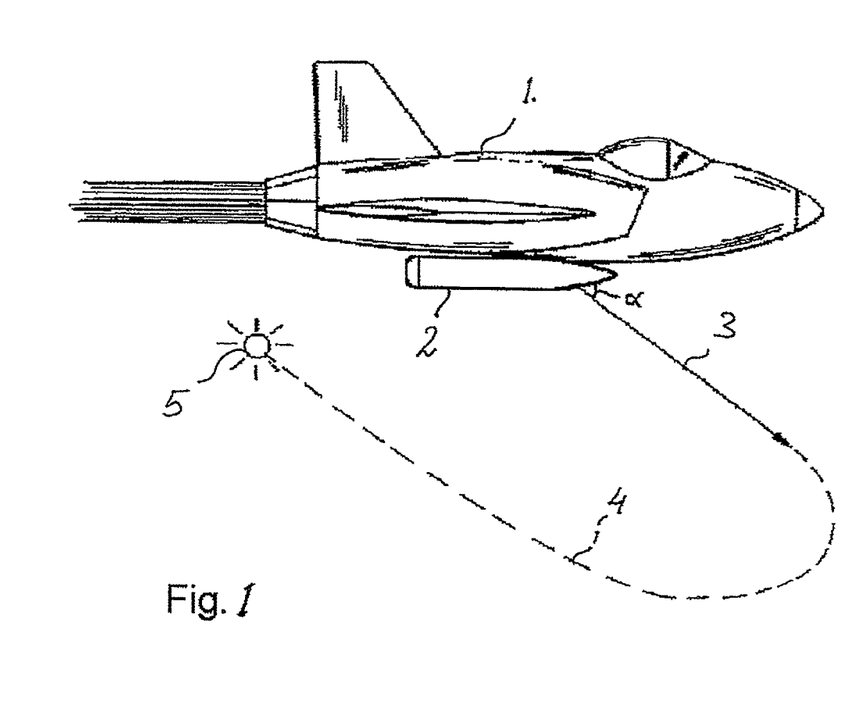
FIG. 1 shows a side view of an aeroplane provided with an arrangement according to the invention for storing and launching counter-measures.
Figure 2:
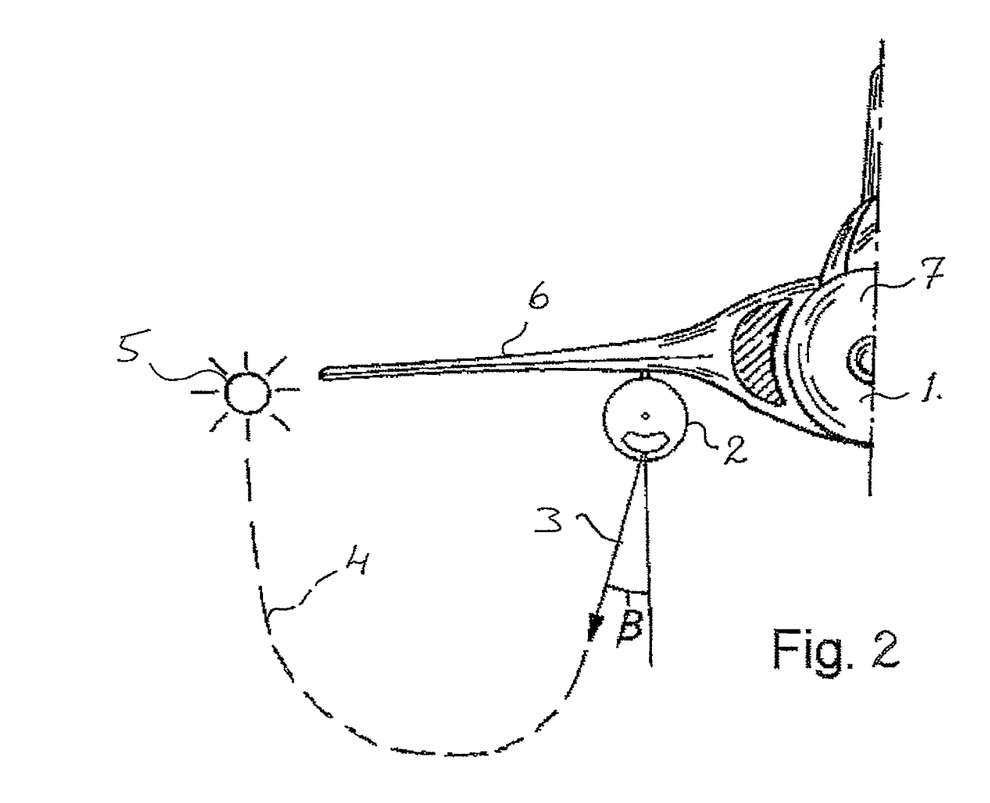
FIG. 2 shows a front view of one half of an aeroplane according to FIG. 1 with an arrangement according to the invention for storing and launching counter-measures.

The aeroplane 1 shown in FIGS. 1 and 2 is provided with an arrangement 2 for storing and launching counter-measures 5, hereinafter referred to as the dispenser 2. The dispenser 2 has its longitudinal direction essentially coinciding with the longitudinal direction of the aeroplane 1. An arrow 3 designates the direction of launching from the dispenser 2. The letter a designates the launch angle relative to the direction of movement of the aeroplane 1 when the counter-measures 5 are launched obliquely forwards and downwards. The lateral angle when the counter-measures are launched with a lateral component has been indicated by $\beta$. The trajectory 4 for a launched flare 5 is indicated by a broken line. During the time from when a flare 5 is activated for launch to when it reaches the position shown in FIGS. 1 and 2, sufficient time has elapsed for the flare 5 to have become a fully active decoy target in close proximity to the aeroplane 1. According to FIGS. 1 and 2, the dispenser 2 is placed under a wing 6 near its attachment to the main body 7 of the aeroplane 1. In this context, it should be noted that the dispenser 2 can also be placed further out on the wing 6 or directly on the main body 7 of the aeroplane 1.

Figure 3:
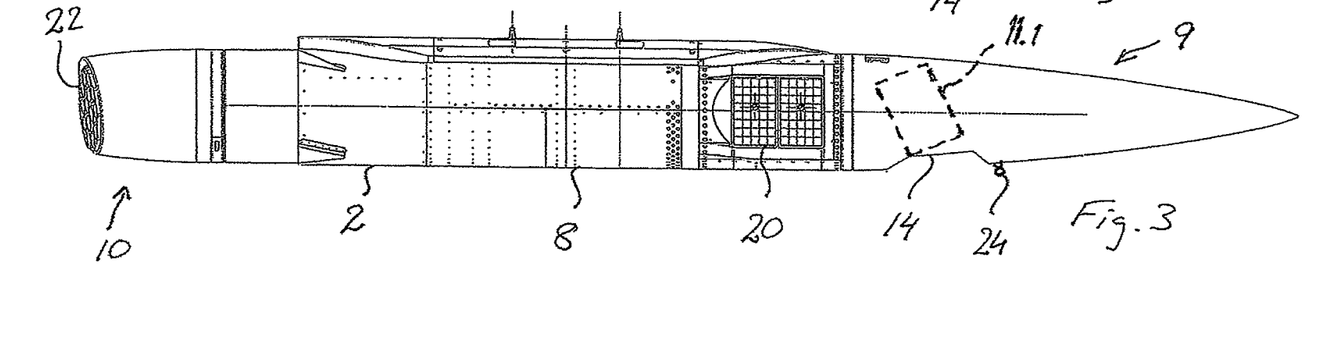
FIG. 3 shows a side view of an arrangement according to the invention for storing and launching counter-measures.
Figure 4:
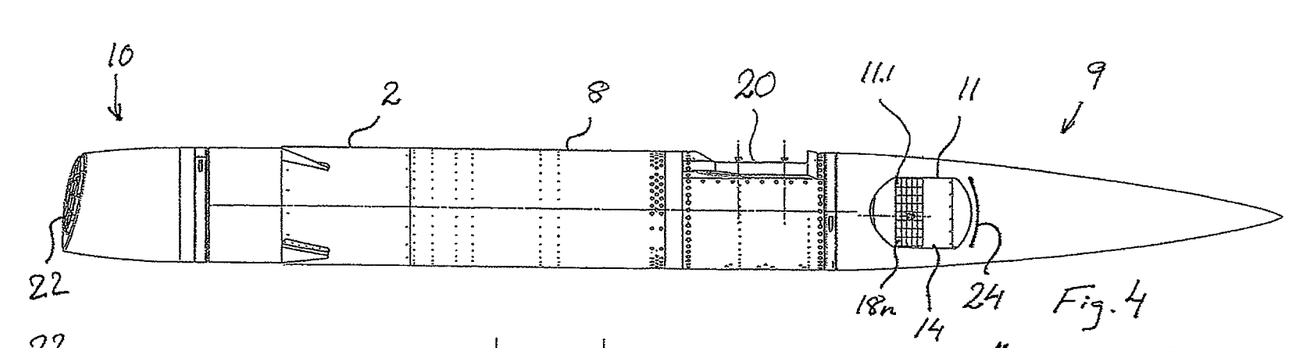
FIG. 4 shows a view from below of the arrangement according to FIG. 3.

The dispenser 2 is now described in more detail with reference to FIGS. 3 and 4. The dispenser 2 comprises an elongate body 8 with a front part 9 and a rear part 10. At the front part 9 there is a launch opening 14 comprising a compartment section 11 with a number of compartments 11.1, 11.2, ... 11.$n$, intended to accommodate counter-measures 5 in the form of preferably flares or chaff. The counter-measures 5 are preferably accommodated in cartridges (not disclosed) which can be of a type known in this field and will therefore not be discussed in detail here. The compartments 11.1, 11.2, ... 11.$n$ can be of the same size or of different sizes and can accommodate identical or different types of counter-measures 5. According to the embodiment disclosed in FIGS. 3 and 4 the compartments 11.1, 11.2, ... 11.$n$ are arranged side by side in rows creating a matrix pattern. The compartments 11.1, 11.2, ... 11.$n$ are suitably designed to slope forwards 30° to 60° and preferably about 45° relative to the aeroplane 1, which is depicted in FIG. 3 with broken lines. The compartments 11.1, 11.2, ..., 11.$n$ are provided with openings 18.1, 18.2, ..., 18.$n$ and are intended to launch the counter-measures 5 in a direction obliquely forwards and downwards and to the side relative to the aeroplane 1.

The dispenser 2 can be provided with a number of launch openings to accommodate counter-measures 5. In FIG. 3 a second launch opening 20 is disclosed on the side of the dispenser 2. Also, a third launch opening 22 is arranged at the rear part 10 of the dispenser.

Figure 5:
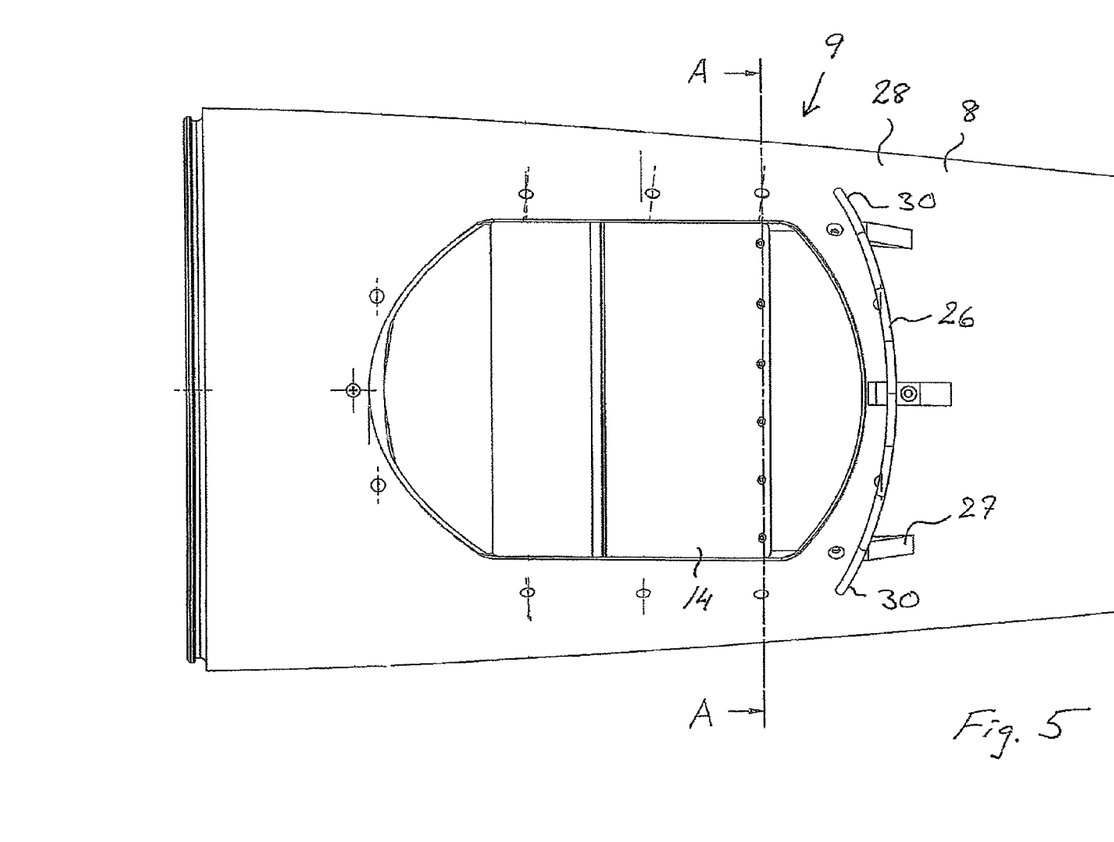
FIG. 5 shows a detail view from below of an arrangement according to the invention provided with a spoiler element.
Figure 6:
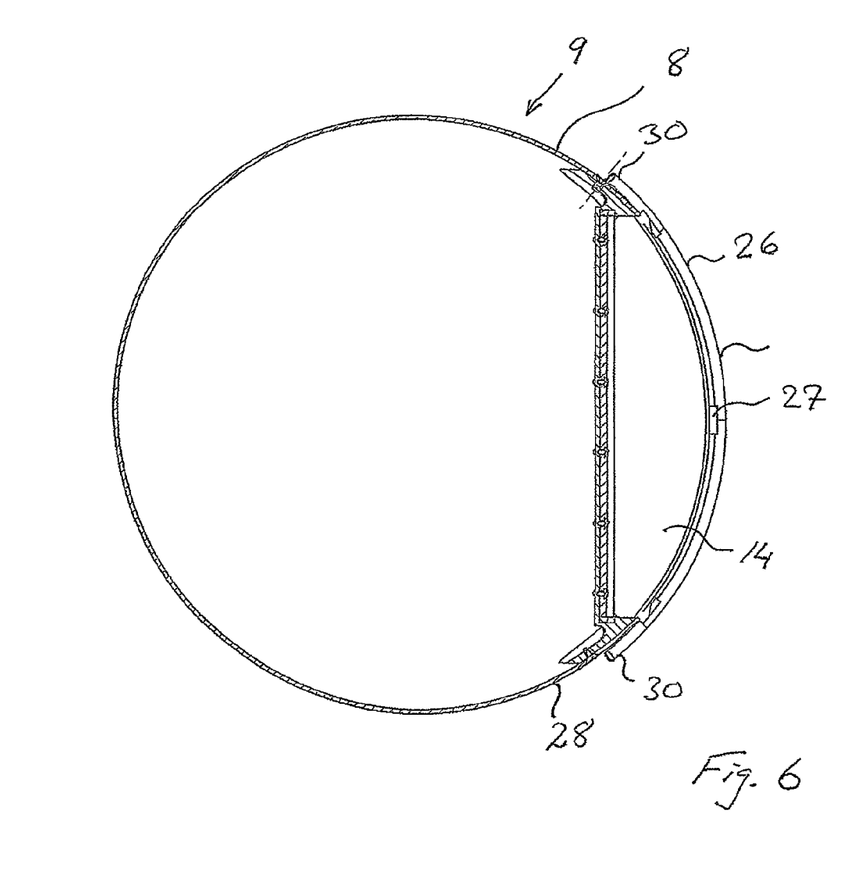
FIG. 6 shows a cross section view of an arrangement according to FIG. 5, along line A-A.

The elongate body 8 of the dispenser is provided with fixed means 24 for acting on the air stream and for permanently creating a low dynamic pressure across the compartment openings 18.1, 18.2, ..., 18.$n$ in order to facilitate launching of the counter-measures 5. Preferably, the fixed means 24 comprises a spoiler element 24 arranged at the front end 9 of the launch opening 14 of the dispenser 2. According to the embodiment disclosed in FIGS. 5 and 6 the spoiler element 24 comprises a substantially cylindrically shaped member 26, which is disposed at a distance from the surface 28 of the body 8 of the dispenser 2. FIG. 5 is a detail view of the front part of the dispenser 2 and FIG. 6 is a cross section view of an arrangement according to FIG. 5 along line A-A. The distance between the substantially cylindrically shaped member 26 and the surface 28 of the body 8 corresponds to substantially the airflow boundary layer thickness. The member 26 is attached to the body 8 by means of distance elements 27. According to the disclosed embodiment the substantially cylindrically shaped member 26 consists of one piece. However, it is also possible to design the spoiler element 24 of a number of short rods arranged in a row to construct the substantially cylindrically shaped member 26

Figure 7:
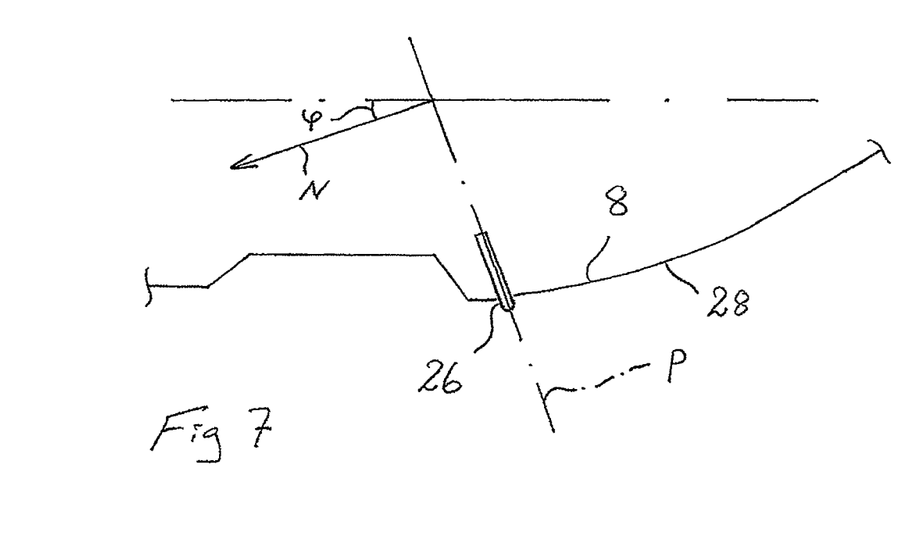
FIG. 7 shows a detail side view of an arrangement according to the invention.

The substantially cylindrically shaped member 26 has a curvature that substantially follows a curvature of the surface 28 of the body 8. In FIG. 7 the substantially cylindrically shaped member 26 is also so arranged on the surface 28 of the body 8 that a normal N to a plane P, which coincides with the member 26, differs from the longitudinal direction of the elongated body 8. This difference results in an angle $\phi$ between the normal and the longitudinal direction of the body 8 in the interval of 0°-45°.

Figure 8:
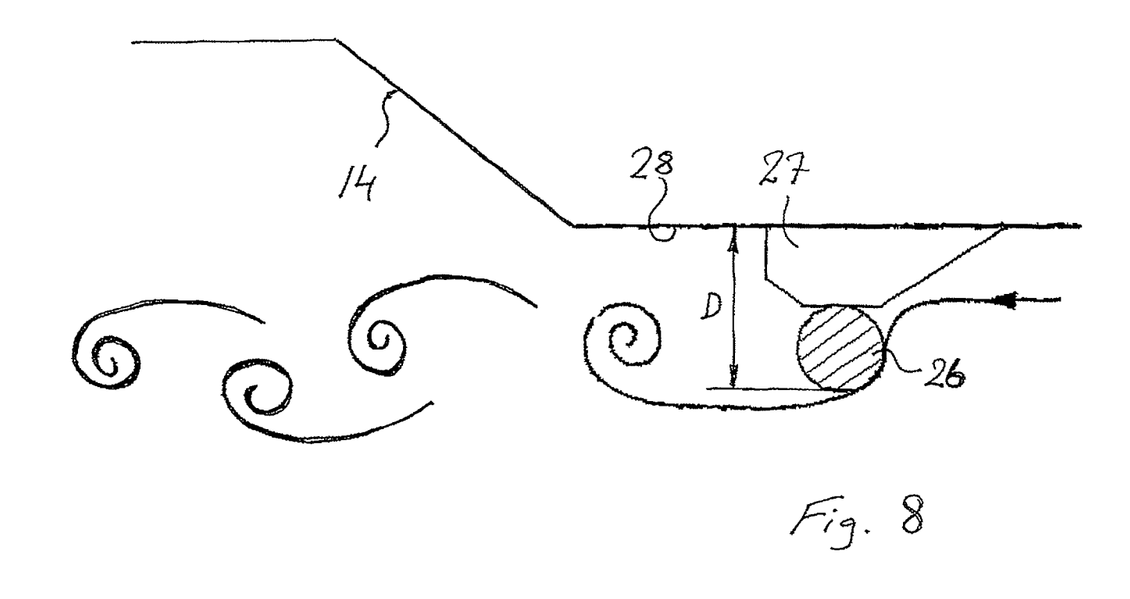
FIG. 8 shows in a schematic view the cross-flow for an arrangement with a spoiler element according to the invention.

FIG. 8 shows in a schematic view the cross-flow for a dispenser 2 with the substantially cylindrically shaped member 26 according to the invention. The substantially cylindrically shaped member 26 has a circular cross section with a diameter which is preferably ⅓ to ½ of the distance D from the surface on which the member 26 is attached to the outermost point of the member 26. In FIG. 7 also one of the distance elements 27 are disclosed. The design of the member 26 maintains the low dynamic pressure across the launch opening 14 and as a result the creation of a low dynamic pressure across the compartment openings 18.1, 18.2, . . . , 18.n effectively counteract oscillations caused by the inherent frequencies of the compartments 11.1, 11.2, . . . 11.n, since the low dynamic pressure near the compartment openings 18.1, 18.2, . . . , 18.n means low energy.

The invention claimed is:

1. A method for launching counter-measures from a launch opening of a dispenser mounted on an aeroplane, the method comprising:
   mounting the dispenser under a wing or a fuselage of the aeroplane,
   launching the counter-measures in a direction obliquely forwards and downwards and to a side relative to the aeroplane, and
   permanently creating a low dynamic pressure across the launch opening of the dispenser utilizing a fixed member acting on an air stream to facilitate launching the counter-measures.

2. The method according to claim 1, wherein the fixed comprises a spoiler element arranged at a front end of the launch opening of the dispenser.

3. An arrangement for storing and launching counter-measures, the arrangement comprising:
   an elongate body comprising at least one launch opening used for storing the counter- measures in compartments, wherein the arrangement is designed to be mounted on an aeroplane, with a longitudinal direction of the elongate body essentially coinciding with a flight direction of the aeroplane, and
   a firing control unit connect to the counter-measures, wherein the firing control unit feeds firing signals to the counter-measures,
   wherein the arrangement is designed to be mounted under a wind or a fuselage of the aeroplane, and wherein the compartments comprise openings and are configured to launch the counter-measures in a direction obliquely forwards and downwards and to a side relative to the aeroplane.

4. The arrangement according to claim 3, wherein the compartments are configured to slope obliquely forwards at 30° to 60° relative to the aeroplane.

5. The arrangement according to claim 3, wherein the compartments comprise openings.

6. The arrangement according to claim 3, wherein the elongate body comprises a fixed member configured to act on an air stream and to permanently create a low dynamic pressure across the compartment openings in order to facilitate launching of the counter-measures.

7. The arrangement according to claim 6, wherein the fixed member comprises a spoiler element arranged at a front end of the front launch opening of the dispenser.

8. The arrangement according to claim 7, wherein the spoiler element comprises a substantially cylindrically shaped member.

9. The arrangement according to claim 8, wherein an outermost position of the substantially cylindrically shaped member is disposed at a distance from the surface of the body of the arrangement.

10. The arrangement according to claim 9, wherein a distance between the outermost position of the substantially cylindrically shaped member and a surface of the body corresponds substantially to a thickness of an airflow boundary layer.

11. The arrangement according to claim 8, wherein the substantially cylindrically shaped member has a curvature that substantially follows a curvature of a surface of the body.

12. The arrangement according to claim 8, wherein the substantially cylindrically shaped member is arranged on a surface of the body such that ends of the substantially cylindrically shaped member are in contact with the surface of the body.

13. The arrangement according to claim 8, wherein the substantially cylindrically shaped member is arranged on a surface of the body such that a normal to a plane, which coincides with the member, differs from the longitudinal direction of the elongated body.

14. The arrangement according to claim 3, wherein the counter- measures comprise flares or chaff.

15. The arrangement according to claim 4, wherein the compartments are configured to slope obliquely forwards at about 45° relative to the aeroplane.

16. The method according to claim 1, wherein the counter-measures comprise flares or chaff.

* * * * *

UNITED STATES PATENT AND TRADEMARK OFFICE
CERTIFICATE OF CORRECTION

PATENT NO. : 8,490,924 B2
APPLICATION NO. : 12/995294
DATED : July 23, 2013
INVENTOR(S) : Zachrisson Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 660 days.

Signed and Sealed this
Twenty-sixth Day of November, 2013

Margaret A. Focarino
*Commissioner for Patents of the United States Patent and Trademark Office*